June 27, 1950
J. B. BARBER
2,512,821
GLASS CUTTING TABLE
Filed June 14, 1945
2 Sheets-Sheet 1
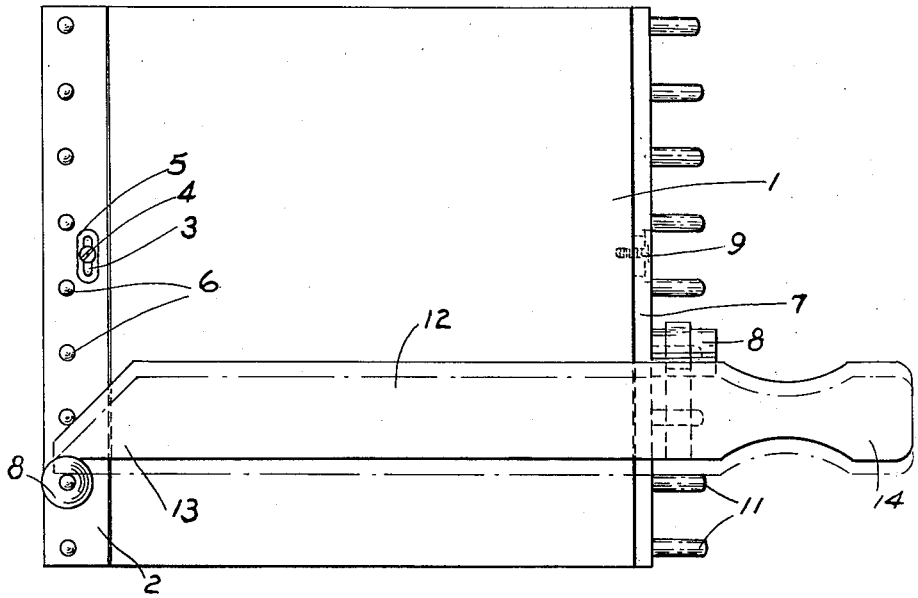
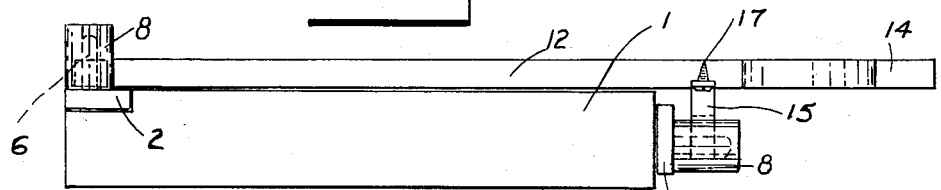
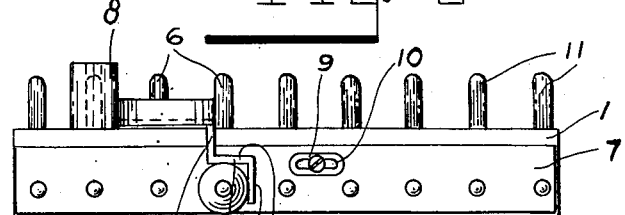
INVENTOR.
JOSEPH B. BARBER
BY *Victor J. Evans & Co.*
ATTORNEYS

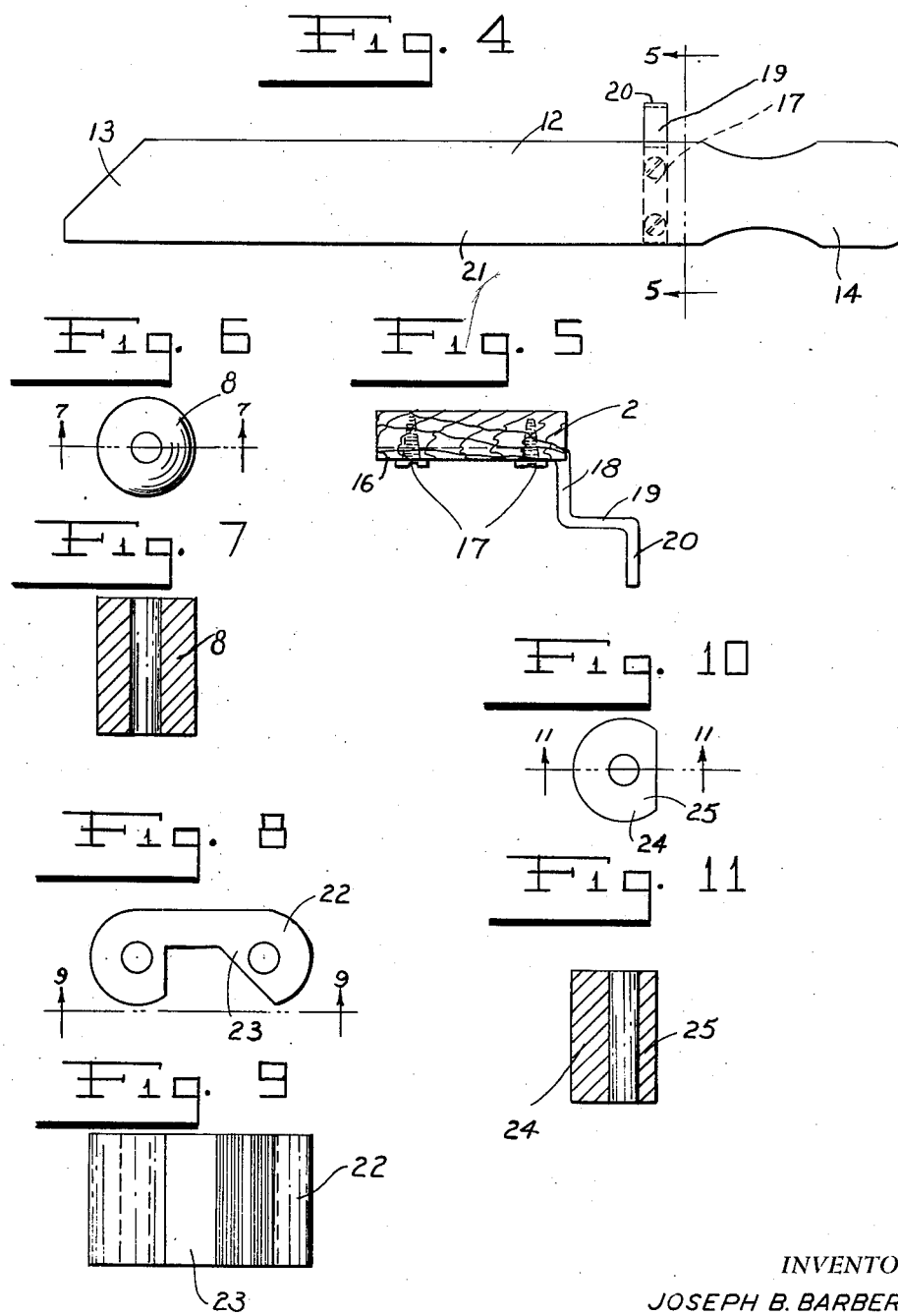

Patented June 27, 1950

2,512,821

UNITED STATES PATENT OFFICE 2,512,821

GLASS CUTTING TABLE

Joseph B. Barber, Mount Vernon, Ohio

Application June 14, 1945, Serial No. 599,403

3 Claims. (Cl. 33—76)

My present invention has reference to improvements in glass cutting tables, and more particularly to an adjustable guide means to facilitate the cutting of sheet glass to exact dimensions. Ordinarily, it has heretofore been the practice to lay out each cut on a fractional measurement, set the guide and run the cutting tool along the guide to make the cut. If another cut was required, the same procedure had to be repeated. With my present invention, the line of cut is to be gauged from a row of pins equally spaced along the top of one side edge of a cutting table and a second identically spaced row along its opposite side edge; the several pins in each row being a measured distance apart. About the pins are adapted to be placed metal elements, preferably cylindrical in form, and which are dimensioned to various fractions of the spaces between the pins, as ⅛ inch, ¼ inch, ⅜ inch, etc. A cutter guide member is provided to cooperate with the pins and it has an angular front end, and a depending abutment at its other end and in setting the guide member to make a cut, it is merely necessary to apply the proper metal elements (hereinafter called "collars") to a selected pin, or pins, in each row for gauging the fractional dimension of the cut, and thereafter to place the front end of the guide member on the top of the front side edge and between adjacent collared and uncollared pins, and the abutment against the corresponding collared pin on the rear of the table, when the cut is to be readily and accurately made by drawing the cutting tool along one side edge of the guide member.

Other and equally important objects and advantages of my invention will be apparent from the following description and drawings, and it is pointed out that changes in form, size, shape, materials, and construction and arrangement of parts are permissible and within the purview of my broad inventive concept, and the scope of the appended claims.

In the drawings wherein I have illustrated a preferred form of my invention:

Figure 1 is a top plan view;

Figure 2 is a side view;

Figure 3 is a bottom edge view;

Figure 4 is a plan view of the cutter guide;

Figure 5 is a section on the line 5—5 of Figure 4;

Figure 6 is a top view of one of my cylindrical collars to fit over the pins;

Figure 7 is a section on the line 7—7 of Figure 6;

Figure 8 is a top plan view of another form of collar which fits over two pins;

Figure 9 is a section on the line 9—9 of Figure 8;

Figure 10 is a top plan view of still another form of my collar with a flat side to provide a flat face, and Figure 11 is a section on the line 11—11 of Figure 10.

In the drawings, wherein like characters of reference are used to designate like or similar parts throughout the several views:

The numeral 1 designates a rectangular glass cutting table which has an elongated plate 2 along the top of the front side edge and that is adjustable endwise by means of a screw 4 and slot 5. This plate 2 has a row of equidistantly spaced pins 6 thereon, which are measured distances apart. The opposite side edge of the table 2 has a plate 7 mounted for endwise adjustment on the same by means of a screw 9 and slot 10, and is provided with a similar row of pins 11 that are measured distances apart. Adapted to be fitted over the pins 6 and 11 are cylindrical collars 8 having measured fractional dimensions of the distance between the pins. In making a cut, the proper sized collars 8 are selected for the cut to be made, one being engaged on a pin 6 and one on a pin 11, and if more than one cut is to be made, other of the pins of both rows are provided with the necessary collars. The guide member 12 has an angular front end 13, and its rear end extended and shaped to form a handle 14. Depending from the lower side of the guide member 12, immediately forward of the handle 14, is an angular abutment 15 which has a base portion 16 secured by screws 17 and has intermediate vertical and lateral portions 18 and 19, respectively, and a lower vertical depending part and end 20. The guide member 12 is placed crosswise on the table 1, with its angled end 13 against a collared pin 6 and the lower angled end portion of the abutment 15 against the corresponding collared pin 11, as in Figures 1 and 2, when the cutting tool is simply drawn along the straight edge 12 to make the proper cut, and if more than one cut is to be made, the guide member 12 is simply repositioned in a like manner against other of the collared pins of both rows that are already set for the next cut. In Figures 8 and 9, a modified form of collar 22 is shown and is adapted to bridge any two adjacent pins and it has a recess 23 intermediate its length to receive the lower angled portion 20, of the abutment 15, to accurately position the guide member on the table and thus insure of like measured fractional distances between the pins. In Figures 10 and 11 the collar 24 is modified to have a flat side 25 which preferably reduces the thickness of its wall by one-half.

From the foregoing it is believed that the operation and advantages of my invention will be apparent, but it is again emphasized that interpretation of its scope should only be conclusive when made in the light of the subjoined claims.

I claim:

1. In a glass cutting table, the combination which comprises a rectangular shaped body having a longitudinally extended recess in the upper surface and extended along one edge thereof, a horizontally disposed bar with spaced upwardly extended pins thereon and having an elongated countersunk longitudinally extended slot therein positioned in said recess, a countersunk head screw positioned in said slot and threaded into said body for adjustably securing the bar in the recess, a vertically positioned bar with spaced outwardly extended horizontally disposed pins thereon and having an elongated countersunk longitudinally extended slot therein positioned against the side of said body opposite to the side having the recess and horizontally disposed bar therein, a countersunk head screw positioned in said slot on the vertically positioned bar and threaded into said body for securing the said vertically disposed bar on the said body, a movable cutter guide bar having a handle at one end and a beveled edge at the other freely positioned on said body, a Z-shaped stop carried by the said cutter guide bar and extended downwardly and rearwardly therefrom, and a plurality of collars bored to receive the pins of the bars whereby with the pins positioned at measured distances from the ends of the body and with collars of fractional sizes positioned on the pins the cutter guide bar engaging the collars is positioned for cutting glass on the said body to a predetermined size and to multiple sizes thereof.

2. In a glass cutter's table the combination which comprises a rectangular shaped horizontally disposed body, a horizontal bar having spaced vertically disposed pins extending upwardly therefrom positioned on one edge of the body, a vertical bar having spaced horizontally disposed pins extended therefrom positioned against the edge of the body opposite to that on which the horizontal bar is positioned, a movable cutter guide bar having a handle at one end and a beveled edge at the other freely positioned on said body, an offset abutment providing a stop carried by the said cutter guide bar and extended downwardly and rearwardly therefrom, and a plurality of collars having flat sides bored to receive the pins of the bars whereby with the pins positioned at measured distances from the end of the body and with collars of fractional sizes positioned on the pins the cutter guide bar engaging the collars is positioned for cutting glass on the said body to a predetermined size and to multiple sizes thereof.

3. In a glass cutter's table the combination which comprises a rectangular shaped horizontally disposed body, a horizontal bar having spaced vertically disposed pins extended upwardly therefrom positioned on end edge of the body, a vertical bar having spaced horizontally disposed pins extended therefrom positioned against the edge of the body opposite to that on which the horizontal bar is positioned, a movable cutter guide bar having a handle at one end and a beveled edge at the other freely positioned on said body, an offset abutment providing a stop carried by the said cutter guide bar and extended downwardly and rearwardly therefrom, and a plurality of collars having notches in the sides for receiving the cutter guide bar and offset abutment thereof, respectively, and bored to receive a plurality of the pins of the bars whereby with the pins positioned at measured distances from the ends of the body and with collars of fractional sizes positioned on the pins the cutter guide bar engaging the collars is positioned for cutting glass on the said body to a predetermined size and to multiple sizes thereof.

JOSEPH B. BARBER.

REFERENCES CITED

The following references are of record in the file of this patent:

UNITED STATES PATENTS

| Number | Name | Date |
| --- | --- | --- |
| 368,928 | Buck | Aug. 30, 1887 |
| 1,192,789 | Klages | July 25, 1916 |
| 1,532,910 | McCann | Apr. 7, 1925 |
| 1,574,965 | Grolemund | Mar. 2, 1926 |
| 2,366,385 | Comfort | Jan. 2, 1945 |

OTHER REFERENCES

Brown & Sharpe Tool Catalog No. 29, page 154, 1924, 33/shelf. (Copy in Div. 66.)